April 26, 1966     N. RICKLESS ETAL     3,247,764
TELEPHOTO TYPE OPTICAL SYSTEM COMPOSED OF TWO
ACHROMATIC DOUBLETS OF OPPOSITE SIGN
Filed Dec. 7, 1962

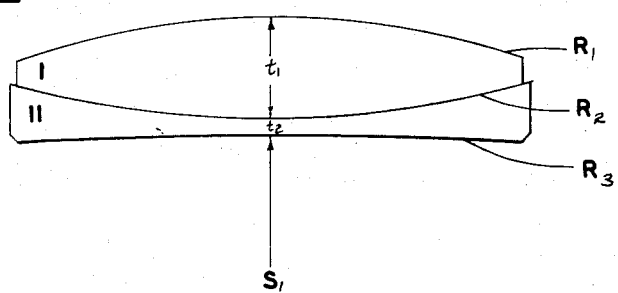

FIG. 1

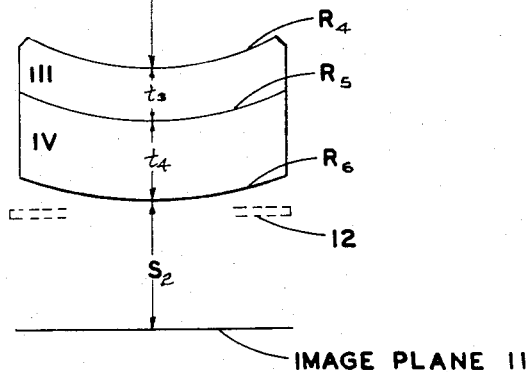

FIG. 2

| E.F.L. = 510.2   f/5.6 | | | | | | |
|---|---|---|---|---|---|---|
| LENS | FOCAL LGTH. | RADII | THICKNESS | SPACES | $n_D$ | $V$ |
| I | $F_I = 165.4$ | $R_1 = 177.01$ | $t_1 = 20.5$ | $S_1 = 281.1$ | 1.620 | 60.3 |
| | | $-R_2 = 232.9$ | | | | |
| II | $F_{II} = -269.8$ | $R_3 = 1180.3$ | $t_2 = 5.0$ | | 1.720 | 36.2 |
| III | $F_{III} = -5008.3$ | $-R_4 = 51.523$ | $t_3 = 10.6$ | $S_2 = 123.1$ | 1.611 | 57.2 |
| | | $-R_5 = 56.494$ | | | | |
| IV | $F_{IV} = -3145.6$ | $-R_6 = 65.464$ | $t_4 = 17.9$ | | 1.649 | 33.8 |

ALL SCALAR QUANTITIES
ARE GIVEN IN MILLIMETERS

NATHAN RICKLESS
PAUL L. RUBEN
             INVENTORS

BY *Frank C. Parker*

ATTORNEY

United States Patent Office 3,247,764
Patented Apr. 26, 1966

3,247,764
TELEPHOTO TYPE OPTICAL SYSTEM COMPOSED OF TWO ACHROMATIC DOUBLETS OF OPPOSITE SIGN
Nathan Rickless, Brighton, and Paul L. Ruben, Rochester, N.Y., assignors to Bausch & Lomb Incorporated, Rochester, N.Y., a corporation of New York
Filed Dec. 7, 1962, Ser. No. 243,117
5 Claims. (Cl. 88—57)

The present invention relates to a telephoto type of optical system such as used principally in photographic apparatus.

Due to the increased use of telephoto objectives, particularly in photography, designers have sought to improve the structure of such objectives for accommodating associated apparatus such as filters, reflex mechanisms and light sensing devices. Such accommodations of the prior art telephoto objectives to new structural restrictions are often difficult to accomplish while maintaining satisfactory performance in high resolution, adequate relative aperture, field coverage and aberration correction.

It is accordingly an object of the present invention to provide a novel optical system of the telephoto type which is compact and lightweight in structure.

A further object is to provide a photographic obejctive of the telephoto type which has a relative aperture as large as $f/5.6$ and covers a format having a 44.5 mm. diagonal, said objective being characterized by high resolution and excellent correction of secondary color in the image produced thereby, said image furthermore being corrected for other chromatic and spherical abberations, coma, tangential and sagittal astigmatism, and field curvature.

Still another object is to provide such a device having an entrance diaphragm located in front of the objective to decrease the size of the front lens member and render the use of internal Waterhouse stops and iris stops unnecessary.

Further objects and advantages will be apparent to those skilled in this art with regard to the details of construction of the various parts of the present invention from a study of the following specification taken together with the accompanying drawing, wherein:

FIG. 1 is an optical diagram showing a preferred form of the present invention; and FIG. 2 is a chart giving the constructional data for a preferred form of said invention.

An optical system generally constructed according to this invention is designated by the numeral 10 in FIG. 1 of the drawing, said optical system being composed of a front compound meniscus lens member designated (I, II), said member consisting of a front double convex lens element I which lies in contact with a rearward double concave lens element II. Separated rearwardly by a large air space $S_1$ from the front lens member is a rear lens member designated (III, IV). Said rear lens member as well as the front lens member are concave toward each other and the rear lens member consists of a convex-concavo pair of lenses, the front lens element being designated III and the rear lens member which lies in contact therewith is designated IV.

The above-identified lens members cooperatively form an image at an image plane 11 located at a comparatively long distance $S_2$ rearwardly of the vertex of the rearmost lens element IV. The axial space $S_2$ is intentionally large enough to accommodate such apparatus as filter mechanisms, which are designated 12 and shown in dotted lines close to the lens element IV, and this space is also intended to accommodate such devices as prism systems, light sensing devices, and reflex mirrors, etc.

One of the characteristic features achieved by this invention is the short overall distance of the optical system, and it will be observed that the distance from the front apex of the front lens member to the image plane 11 is considerably less than the equivalent focal length of the optical system 10 which is the optical condition prevailing in a true telephoto lens system.

The present invention is so constructed and arranged as to provide an optical system of a telephoto type which is well corrected for spherical and chromatic image aberrations, particularly the condition known as secondary color, along with an excellent state of correction for coma, tangential and sagittal astigmatism and field curvature. These advantageous optical conditions are obtained in the present invention along with the provision of a relative aperture at least as large as $f/5.6$ and the optical system 10 is intended to provide a high resolution of an order which is known as a diffraction-limited performance of the optical system. To further improve the optical system an entrance diaphragm having a diameter similar to the free aperture of the front lens member is located forwardly of said front lens member so as to decrease the required size of the front lens and to render the use of internal stops, such as Waterhouse stops, unnecessary.

In order to achieve all of the aforementioned desirable features and improvements over the prior art, the focal lengths of the respective front and rear lens members (I, II), and (III, IV) should have numerical values as stated in the mathematical expressions herebelow, $$.74F < (I, II) < .82F$$
$$3.4F < -F(III, IV) < 3.8F$$

wherein F designates the equivalent focal length of the optical system and the minus (−) sign denotes negative power. Of equal importance is the numerical value of the interlens air space $S_1$ which should lie between .49F and .60F, the related axial thickness of the front lens member being numerically between .044F and .055F and the axial thickness of the rear member being numerically between .050F and .062F. With regard to the focal lengths $F_I$, $F_{II}$, $-F_{III}$ and $-F_{IV}$ of the individual lens elements, the numerical values of the successive lens elements should be as specified in the table of mathematical expressions herebelow, $$.31F < F_I < .34F$$
$$.50F < -F_{II} < .55F$$
$$9.3F < -F_{III} < 10.3F$$
$$5.8F < -F_{IV} < 6.5F$$

Furthermore, the axial thicknesses of the successive lens elements I–IV are designated, respectively, $t_1$–$t_4$ and have numerical relationships substantially as given herebelow, $$\frac{t_1}{t_2} = 4.10 \qquad \frac{t_3}{t_4} = .592$$

Further specifications of the required optical parameters are given in the table of mathematical statements herebelow, wherein $R_1$–$R_6$ designate the radii of the successive lens surfaces, which are numbered from the front toward the rear of the optical system, $t_1$–$t_4$ designate the successive axial lens thicknesses, $S_1$–$S_2$ designate, respectively, the interlens air space and the lens-to-image air space, and $n_D$ and $\nu$ designate, respectively, the refractive index and Abbe number of the lens materials used in the succesive lenses,

| | |
|---|---|
| $.31F<R_1<.48F$ | $.036F<t_1<.045F$ |
| $.41F<-R_2<.50F$ | $.0088F<t_2<.0108F$ |
| $2.0F<R_3<5.0F$ | $.0187F<t_3<.0229F$ |
| $.09F<-R_4<.11F$ | $.031F<t_4<.039F$ |
| $.10F<-R_5<.12F$ | $.496F<S_1<.606F$ |
| $.11F<-R_6<.14F$ | $.217F<S_2<.265F$ |
| $1.615<n_D(I)1.625$ | $55.0<\nu(I)<65.0$ |
| $1.715<n_D(II)1.725$ | $32.0<\nu(II)<40.0$ |
| $1.606<n_D(III)1.616$ | $52.0<\nu(III)<62.0$ |
| $1.644<n_D(IV)1.654$ | $30.0<\nu(IV)<38.0$ |

In the above table the minus (—) sign applies to those radii whose centers of curvature are situated on the object or entrant side of the vertex of the respective lens surfaces.

It is well known in the art that lenses generally cannot be manufactured economically in commercial quantities by the sole use of ideal or strictly nominal values of its lens parameters. For practical reasons therefore, commercially acceptable ranges of values are set forth for certiain lens parameters in the foregoing tables, said ranges being so chosen as to describe a plurality of modified optical systems of the kind here disclosed, the values of the pertinent lens parameters thereof lying within the given ranges. Each such modified or non-ideal optical system is selectively assembled from a great number of slightly dissimilar lenses having lens parameter values within the given ranges by skilled workmen so that the resulting optical performance is good and is commercially acceptable. The aforesaid lens parameter values may in many cases all lie unilaterally on the same side of the nominal values. All of the above-mentioned optical parameters are more specifically stated in the table herebelow, wherein the designations of the various parameters remain the same.

$$F_I=.324F$$
$$-F_{II}=.527F$$
$$-F_{III}=9.79F$$
$$-F_{IV}=6.17F$$

| | |
|---|---|
| $R_1=.3462F$ | $t_1=.0402F$ |
| $-R_2=.457F$ | $t_2=.00978F$ |
| $R_3=2.33F$ | $t_3=.0208F$ |
| $-R_4=.101F$ | $t_4=.035F$ |
| $-R_5=.1101F$ | $S_1=.551F$ |
| $-R_6=.1279F$ | $S_2=.241F$ |
| $n_D(I)=1.620$ | $\nu(I)=60.3$ |
| $n_D(II)=1.720$ | $\nu(II)=36.2$ |
| $n_D(III)=1.611$ | $\nu(III)=57.2$ |
| $n_D(IV)=1.649$ | $\nu(IV)=33.8$ |

One successful form of the present invention is described and specified numerically in the chart of values given herebelow, wherein all of the optical parameters bear the same designations as given hereabove.

All of the scalar values in the above chart are given in millimeters.

Although only one form of this invention has been shown and described in detail, other forms are possible and changes may be made in the specific values of the optical parameters within the ranges specified hereabove without departing from the spirit of the invention as defined in the claims appended hereto.

We claim:

1. A telephoto type of lens system having a relative aperture of substantially $f/5.6$ and being composed of a front compound lens member having a front double convex lens element I and a rear double concave lens element II in contact with the front element, and further being composed of a rear compound lens member having a front meniscus lens element III and a rear meniscus lens element IV in contact therewith, the values of the focal lengths of the successive lens elements $F_I$ to $F_{IV}$ being specified substantially in the table of mathematical statements herebelow, $$F_I=.324F$$
$$-F_{II}=.527F$$
$$-F_{III}=9.79F$$
$$-F_{IV}=6.17F$$

wherein F designates the equivalent focal length of said system and the minus (—) sign denotes negative power, the successive axial lens thicknesses $t_1$ to $t_4$ having values which are specified in the table of mathematical statements herebelow, $$t_1=.0402F$$
$$t_2=.0098F$$
$$t_3=.208F$$
$$t_4=.035F$$

and the space between said lens members is substantially .55F.

2. A telephoto type of lens system having a relative aperture of substantially $f/5.6$ and being composed of a front compound lens member having a front double convex lens element I and a rear double concave lens element II in contact with the front element, and further being composed of a rear compound lens member having a front meniscus lens element II and a rear meniscus lens element IV in contact with the front element, the values for the radii of the successive lens surfaces which are designated $R_1$ to $R_6$, the values of the axial lens thicknesses $t_1$ to $t_4$ of the successive lens elements I to IV, and the value for the interlens air space $S_1$ and rearward air space $S_2$ being as specified in the table of mathematical statements given herebelow,

| | |
|---|---|
| $.31F<R_1<.48F$ | $.036F<t_1<.045F$ |
| $.41F<-R_2<.50F$ | $.0088F<t_2<.0108F$ |
| $2.0F<R_3<5.0F$ | $.0187F<t_3<.0229F$ |
| $.09F<-R_4<.11F$ | $.031F<t_4<.039F$ |
| $.10F<-R_5<.12F$ | $.496F<S_1<.606F$ |
| $.11F<-R_6<.14F$ | $.217F<S_2<.265F$ | wherein F designates the equivalent focal length of said system, and the minus (—) sign applies to those radii E.F.L.=510.2  Rel. Aper.=$f/5.6$

| Lens | Focal Length | Radii | Thicknesses | Spacings | $n_D$ | $\nu$ |
|---|---|---|---|---|---|---|
| I | $F_I=165.4$ | $R_1=177.01$ | $t_1=20.5$ | | 1.620 | 60.3 |
| | | $-R_2=232.9$ | $t_2=5.0$ | $S_1=281.1$ | 1.720 | 36.2 |
| II | $F_{II}=-269.8$ | $R_3=1,180.3$ | | | | |
| | | $-R_4=51.523$ | | | | |
| III | $F_{III}=-5,008.3$ | $-R_5=56.494$ | $t_3=10.6$ | | 1.611 | 57.2 |
| IV | $F_{IV}=-3,145.6$ | $-R_6=65.464$ | $t_4=17.9$ | $S_2=123.1$ | 1.649 | 33.8 | whose centers of curvature are situated on the object or entrant side of the vertex of the respective lens surface.

3. A telephoto type of lens system as set forth in claim 2 and further characterized by values for the refractive index $n_D$ and Abbe number $\nu$ as stated in the table of mathematical expressions herebelow with reference to each of the aforesaid lens elements I to IV, $1.615 < n_D(I) < 1.625$     $55.0 < \nu(I) < 65.0$
$1.715 < n_D(II) < 1.725$     $32.0 < \nu(II) < 40.0$
$1.606 < n_D(III) < 1.616$     $52.0 < \nu(III) < 62.0$
$1.644 < n_D(IV) < 1.654$     $30.0 < \nu(IV) < 38.0$ 4. A telephoto type of lens system having a relative aperture of substantially $f/5.6$ and being composed of a front compound lens member having a front double convex lens element I and a rear double concave lens element II in contact with the front element, and further being composed of a rear compound lens member having a front meniscus lens element III and a rear meniscus lens element IV in contact with the front element, the values for the radii of the successive lens surfaces which are designated $R_1$ to $R_6$ numbering from the front of the system, the values of the axial thicknesses $t_1$ to $t_4$ of the successive lens elements I to IV, the value $S_1$ for the interlens air space and the value $S_2$ of the air space reading from the rearmost vertex to the image plane, and the values for refractive index $n_D$ and Abbe number $\nu$ being specified in the table of mathematical statements herebelow, wherein F represents the equivalent focal length of said system and the minus (—) sign accompanying the $R_2$, $R_4$, $R_5$, and $R_6$ designations applies to those radii whose centers of curvature are situated on the object side of the vertex of the refractive lens surface, $R_1 = .3462F$
$-R_2 = .457F$
$R_3 = 2.33F$
$-R_4 = .101F$
$-R_5 = .1101F$
$-R_6 = .1279F$
$n_D(I) = 1.620$
$n_D(II) = 1.720$
$n_D(III) = 1.611$
$n_D(IV) = 1.649$ $t_1 = .0402F$
$t_2 = .00978F$
$t_3 = .0208F$
$t_4 = .035F$
$S_1 = .551F$
$S_2 = .241F$
$\nu(I) = 60.3$
$\nu(II) = 36.2$
$\nu(III) = 57.2$
$\nu(IV) = 33.8$ 5. A telephoto type of lens system having a relative aperture of substantially $f/5.6$ and being composed of a front compound lens member having a front double convex lens element I and a rear double concave lens element II in contact with the front element, and further being composed of a rear compound lens member having a front meniscus lens element III and a rear meniscus lens element IV in contact with the front element, the values for the radii of the successive lens surfaces which are designated $R_1$ to $R_6$ numbering from the front of the system, the values of the axial thicknesses $t_1$ to $t_4$ of the successive lens elements I to IV, the value $S_1$ for the interlens air space and the value $S_2$ of the air space from the rearmost vertex to the image plane, and the values for refractive index $n_D$ and Abbe number $\nu$ being specified in the table of mathematical statements herebelow, wherein F represents the equivalent focal length of said system and the minus (—) sign accompanying the radius designations applies to those radii whose centers of curvature are situated on the object side of the vertex of the respective lens surface E.F.L. = 510.2     Rel. Apert. = $f/15.6$

| Lens | Focal Length | Radii | Thicknesses | Spacings | $n_D$ | $\nu$ |
|---|---|---|---|---|---|---|
| I | $F_I = 165.4$ | $R_1 = 177.01$ | $t_1 = 20.5$ | | 1.620 | 60.3 |
|  |  | $-R_2 = 232.9$ |  |  |  |  |
| II | $F_{II} = -269.8$ |  |  |  | 1.720 | 36.2 |
|  |  | $R_3 = 1180.3$ | $t_2 = 5.0$ | $S_1 = 231.1$ |  |  |
|  |  | $-R_4 = 51.523$ |  |  |  |  |
| III | $F_{III} = -5,008.3$ |  | $t_3 = 10.6$ |  | 1.611 | 57.2 |
|  |  | $-R_5 = 56.494$ |  |  |  |  |
| IV | $F_{IV} = -3,145.6$ |  | $t_4 = 17.9$ |  | 1.649 | 33.8 |
|  |  | $-R_6 = 65.464$ |  | $S_2 = 123.1$ |  |  |

All of the scalar values in the above chart are given in millimeters.

References Cited by the Examiner

UNITED STATES PATENTS 2,327,759    8/1943    Bennett _____ 88—57
2,810,322    10/1957    Tronnier _____ 88—57
3,039,360    6/1962    Hopkins _____ 88—57

JEWELL H. PEDERSEN, *Primary Examiner.*

JOHN K. CORBIN, *Assistant Examiner.*